US012033582B2

(12) United States Patent
Baek et al.

(10) Patent No.: US 12,033,582 B2
(45) Date of Patent: Jul. 9, 2024

(54) LEVEL SHIFTER AND DISPLAY DEVICE INCLUDING THE SAME

(71) Applicant: LG Display Co., Ltd., Seoul (KR)

(72) Inventors: Lok Dam Baek, Goyang-si (KR); Young Kyu Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/991,159

(22) Filed: Nov. 21, 2022

(65) Prior Publication Data

US 2023/0215376 A1 Jul. 6, 2023

(30) Foreign Application Priority Data

Dec. 31, 2021 (KR) ........................ 10-2021-0194725

(51) Int. Cl.
*G09G 3/3266* (2016.01)
*G09G 3/20* (2006.01)
*G09G 3/3208* (2016.01)

(52) U.S. Cl.
CPC ... *G09G 3/3266* (2013.01); *G09G 2310/0286* (2013.01); *G09G 2310/0289* (2013.01); *G09G 2310/08* (2013.01); *G09G 2320/045* (2013.01)

(58) Field of Classification Search
None
See application file for complete search history.

(56) References Cited

U.S. PATENT DOCUMENTS

2020/0143752 A1* 5/2020 Jung .................... G09G 3/3266
2021/0183318 A1* 6/2021 Kim ..................... G09G 3/3266

* cited by examiner

*Primary Examiner* — Chineyere D Wills-Burns
*Assistant Examiner* — Amen W Bogale
(74) *Attorney, Agent, or Firm* — Birch, Stewart, Kolasch & Birch, LLP

(57) ABSTRACT

A display device can include a timing controller; a level shifter including a signal input circuit to receive a first clock signal and a second clock signal, a driving mode conversion circuit to self-generate one or more mode signals based on the first and second clock signals for adjusting a driving mode, and a signal output circuit to generate a plurality of scan clock signals based on the one or more mode signals, the first and second clock signals; a shift register configured to generate a scan signal based on the plurality of scan clock signals; and a display panel configured to display an image based on the scan signal. Also, the level shifter is configured to in response to a width of a pulse of the first clock signal being greater than a threshold value, sequentially output a pulse for each of the plurality of scan clock signals.

19 Claims, 12 Drawing Sheets

LEVEL SHIFTER AND DISPLAY DEVICE INCLUDING THE SAME

CROSS-REFERENCE TO RELATED APPLICATIONS

This application claims the benefit of priority to the Korean Patent Application No. 10-2021-0194725, filed in the Republic of Korea on Dec. 31, 2021, the entire contents of which are hereby expressly incorporated by reference into the present application.

BACKGROUND OF THE DISCLOSURE

Field of the Invention

The present invention relates to a level shifter and a display device including the same.

Discussion of the Related Art

With the development of information technology, the market for display devices, which are connection media between users and information, is growing. Accordingly, display devices, such as a light emitting display (LED) device, a quantum dot display (QDD) device, and a liquid crystal display (LCD) device, are increasingly being used.

The display devices described above include a display panel including sub-pixels, drivers that output driving signals for driving the display panel, a power supply that generates power to be supplied to the display panel or the driver, and the like.

In the aforementioned display devices, when driving signals, for example, a scan signal and a data signal, are supplied to the sub-pixels formed in the display panel, selected sub-pixels transmit light or directly emit light, thereby displaying an image.

However, as display devices become larger and have higher resolution and as smaller and smaller bezel areas are desired by users, input terminals and signal lines of various components (e.g., a level shifter) become more numerous and take up space, which limits design freedom and increases manufacturing costs.

SUMMARY OF THE DISCLOSURE

An object of the present invention is to increase a degree of freedom in design at the time of manufacturing a display device by reducing the number of input terminals and signal lines required for a circuit configuration based on a level shifter capable of self-generating mode signals internally for converting or adjusted driving modes of the level shifter by itself.

An aspect of the present invention is to provide a display device include a timing controller configured to output a first clock signal and a second clock signal; a level shifter including a signal input circuit configured to receive the first clock signal and the second clock signal from the timing controller, a driving mode conversion circuit configured to self-generate one or more mode signals based on the first clock signal and the second clock signal for adjusting a driving mode of the level shifter, and a signal output circuit configured to generate a plurality of scan clock signals based on the one or more mode signals, the first clock signal and the second clock signal; a shift register configured to generate a scan signal based on the plurality of scan clock signals output from the level shifter; and a display panel configured to display an image based on the scan signal output from the shift register, in which the level shifter is configured to in response to a width of a pulse of the first clock signal being greater than a threshold value, sequentially output a pulse for each of the plurality of scan clock signals.

According to an aspect of the present invention, the one or more mode signals are not generated based on any other signal externally input to the level shifter other than the first clock signal and the second clock signal.

According to another aspect of the present invention, the plurality of scan clock signals are shifted and do not overlap with each other.

According to an aspect of the present invention, the level shifter is configured to in response to a width of a pulse of the first clock signal being less than a threshold value, output two successive pulses for one of the plurality of scan clock signals.

According to another aspect of the present invention, other scan clock signals among the plurality of scan clock signals, which are different than the one of the plurality of scan clock signals, do not include any pulse generated between the two successive pulses.

According to an aspect of the present invention, the level shifter is configured to in response to a pulse of the first clock signal overlapping with a pulse of the second clock signal, perform a mute operation for one of the plurality of scan clock signals so that no pulse is output for the one of the plurality of scan clock signals when the pulse of the first clock signal overlaps with the pulse of the second clock signal.

According to another aspect of the present invention, the level shifter is configured to in response to the pulse of the first clock signal not overlapping with the pulse of the second clock signal, omit the mute operation and output a pulse for one of the plurality of scan clock signals that overlaps with both of the pulse of the first clock signal and the pulse of the second clock signal.

According to an aspect of the present invention, the level shifter is configured to output a pulse for one of the plurality of scan clock signals, in which a rising edge of the pulse for the one of the plurality of scan clock signals is based on a rising edge of the first clock signal, and a falling edge of the pulse for the one of the plurality of scan clock signals is based on a rising edge of the second clock signal.

According to yet another aspect of the present invention, pulses of the plurality of scan clock signals do not overlap with each other.

According to an aspect of the present invention, the driving mode conversion circuit includes a counter configured to measure a time period of a pulse of the first clock signal, and in response to the time period being less than a threshold value, output a first mode signal to the signal output circuit, and the signal output circuit is configured to in response to receiving the first mode signal from the driving mode conversion circuit, output two successive pulses for one of the plurality of scan clock signals based on the first clock signal and the second clock signal.

According to another aspect of the present invention, the driving mode conversion circuit includes a logical AND gate configured to receive the first clock signal and the second clock signal, and in response to receiving a pulse of the first clock signal and a pulse of the second clock signal at a same time, output a second mode signal to the signal output circuit, and the signal output circuit is configured to in response to receiving the second mode signal from the driving mode conversion circuit, perform a mute operation for one of the plurality of scan clock signals so that no pulse is output for the one of the plurality of scan clock signals when the pulse of the first clock signal and the pulse of the second clock signal are received by the logical AND gate at the same time.

According to an aspect of the present invention, a pulse of each of the plurality of scan clock signals has a gate pulse modulation period at a falling edge of the pulse and including a decreasing slope, a start of the gate pulse modulation period is based on a rising edge of the second clock signal, and an end of the gate pulse modulation period is based on a falling edge of the second clock signal.

According to another aspect of the present invention, a pulse of each of the plurality of scan clock signals is synchronized with a rising edge of the first clock signal and a falling edge of the second clock signal.

Another aspect of the present invention, is to provide level shifter including an internal circuit configured to receive a first clock signal and a second clock signal; in response to a width of a pulse of the first clock signal being greater than a threshold value, sequentially output a pulse for each of a plurality of scan clock signals; in response to the width of the pulse of the first clock signal being less than the threshold value, output two successive pulses for one of the plurality of scan clock signals; and in response to the pulse of the first clock signal overlapping with the pulse of the second clock signal, perform a mute operation for the one of the plurality of scan clock signals so that no pulse is output for the one of the plurality of scan clock signals when the pulse of the first clock signal overlaps with the pulse of the second clock signal.

To achieve these objects and other advantages and in accordance with the purpose of the invention, as embodied and broadly described herein, a display device includes a timing controller, a level shifter including a driving mode conversion circuit configured to generate a mode signal for converting a driving mode based on first and second clock signals output from the timing controller, and a signal output circuit configured to generate and output a plurality of scan clock signals based on the first and second clock signals and the mode signal, a shift register configured to generate a scan signal based on the plurality of scan clock signals output from the level shifter, and a display panel configured to display an image based on the scan signal output from the shift register, in which the driving mode conversion circuit controls generation of high periods of the plurality of scan clock signals based on the first clock signal or the second clock signal.

The level shifter can control clock shift so that one high period or at least two high periods are included in at least one scan clock signal based on the first clock signal.

The level shifter can execute clock shift so that one high period is included in the at least one scan clock signal or may not execute clock shift so that at least two high periods are included in the at least one scan clock signal based on a pulse width of a high period of the first clock signal and an internally determined threshold value.

The level shifter can count a time period during which the high period of the first clock signal is maintained, can execute clock shift so that one high period is included in the at least one scan clock signal if the duration of the high period of the first clock signal is greater than the threshold value, and may not execute clock shift so that at least two high periods are included in the at least one scan clock signal if the duration of the high period of the first clock signal is less than the threshold value.

The level shifter can perform control so that one high period is omitted instead of being included in at least one of the plurality of scan clock signals according to whether a high period of the first clock signal and a high period of the second clock signal overlap.

The level shifter can perform control so that one high period is omitted instead of being included in at least one of the plurality of scan clock signals if a high period of the first clock signal and a high period of the second clock signal overlap.

The driving mode conversion circuit includes a counter configured to generate a first mode signal for controlling clock shift so that one high period or at least two high periods are included in at least one of the scan clock signals based on a result of counting a time period during which a high period is maintained in the first clock signal, and an AND gate configured to generate a second mode signal for controlling one high period to be omitted instead of being included in at least one of the plurality of scan clock signals based on a result of an AND operation performed on the first clock signal and the second clock signal.

In another aspect of the present invention, a level shifter includes a signal input circuit configured to receive first and second clock signals from the outside, a driving mode conversion circuit configured to generate a mode signal for converting a driving mode based on the first and second clock signals transmitted from the signal input circuit, and a signal output circuit configured to generate and output a plurality of scan clock signals based on the first and second clock signals transmitted from the signal input circuit and the mode signal output from the driving mode conversion circuit, in which generation of a high period in at least one of the plurality of scan clock signals is controlled by the mode signal.

The driving mode conversion circuit can include a counter configured to generate a first mode signal for controlling clock shift so that one high period or at least two high periods are included in the at least one scan clock signal based on a result of counting a time period during which a high period is maintained in the first clock signal.

The driving mode conversion circuit can include an AND gate configured to generate a second mode signal for controlling one high period to be omitted instead of being included in at least one of the plurality of scan clock signals based on a result of an AND operation performed on the first clock signal and the second clock signal.

The present invention has an effect of reducing the number of input terminals and signal lines required for a circuit configuration based on a level shifter capable of generating mode signals for converting driving modes by itself. In addition, the present invention can reduce the number of input terminals and signal lines of the level shifter, thereby increasing a degree of freedom in design at the time of manufacturing a display device.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

A display device according to embodiments of the present invention can be implemented as a television, a video player, a personal computer (PC), a home theater, an automobile electric device, a smartphone, and the like, but is not limited thereto. The display device according to embodiments of the present invention can be implemented as a light emitting display (LED) device, a quantum dot display (QDD) device, a liquid crystal display (LCD) device, or the like. However, hereinafter, a light emitting display device that directly emits light based on inorganic light emitting diodes or organic light emitting diodes will be used as an example for convenience of description.

Figure 1:
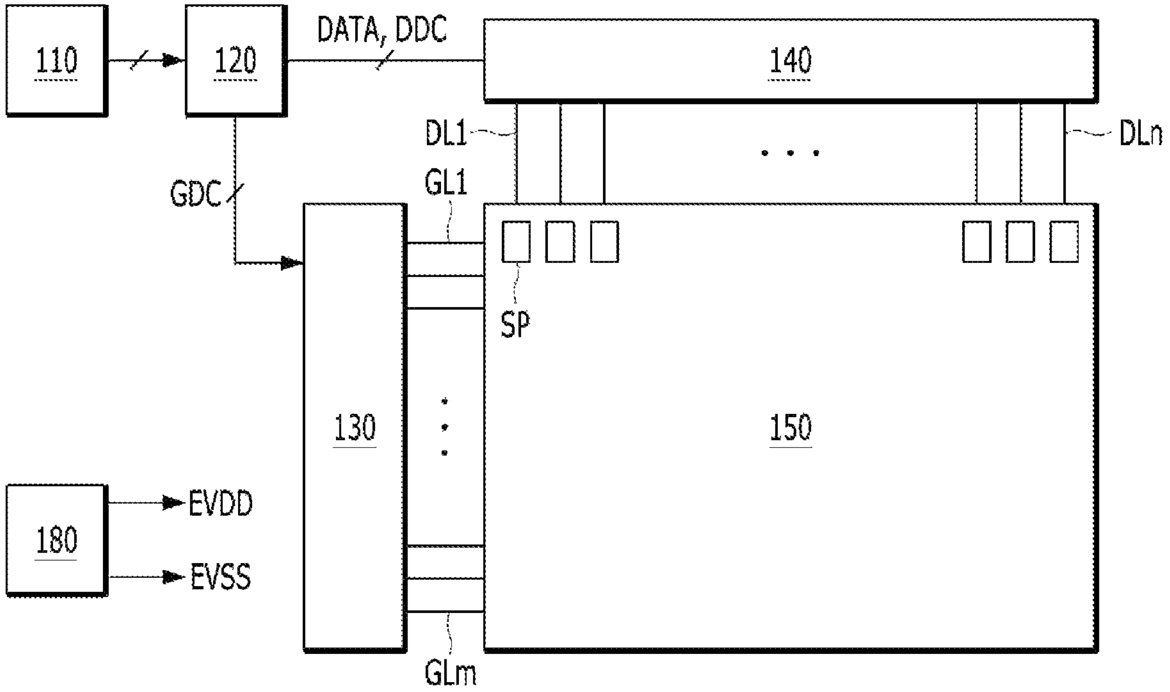
FIG. 1 is a block diagram schematically illustrating a light emitting display device according to an embodiment of the present invention.
Figure 2:
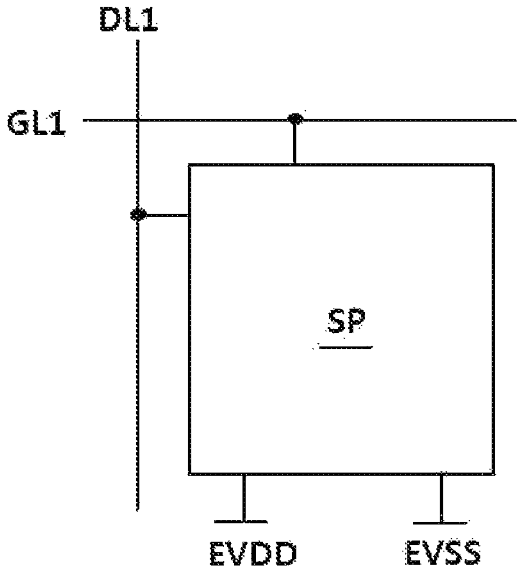
FIG. 2 is a configuration diagram schematically illustrating a sub-pixel illustrated in FIG. 1 according to an embodiment of the present invention.

FIG. 1 is a block diagram schematically illustrating a light emitting display device, and FIG. 2 is a configuration diagram schematically illustrating a sub-pixel illustrated in FIG. 1.

As shown in FIGS. 1 and 2, the light emitting display device includes an image provider 110 (e.g., a host system), a timing controller 120, a scan driver 130 (e.g., a gate driver), a data driver 140, a display panel 150, a power supply 180, and the like.

The image provider (set or host system) 110 can output various driving signals along with an image data signal supplied from the outside or an image data signal stored in an internal memory. The image provider 110 can supply a data signal and various driving signals to the timing controller 120.

The timing controller 120 can output a gate timing control signal GDC for controlling the operation timing of the scan driver 130, a data timing control signal DDC for controlling the operation timing of the data driver 140, and various synchronization signals (a vertical synchronization signal Vsync and a horizontal synchronization signal Hsync). The timing controller 120 can supply a data signal DATA supplied from the image provider 110 along with the data timing control signal DDC to the data driver 140. The timing controller 120 can take the form of an integrated circuit (IC) and be mounted on a printed circuit board, but is not limited thereto.

The scan driver 130 can output a scan signal (or a scan voltage) in response to the gate timing control signal GDC supplied from the timing controller 120. The scan driver 130 can supply scan signals to sub-pixels included in the display panel 150 through gate lines GL1 to GLm. Here, m can be a positive number such as an integer greater than 1. The scan driver 130 can take the form of an IC or can be directly formed on the display panel 150 in a gate-in-panel structure, but is not limited thereto.

The data driver 140 can sample and latch the data signal DATA in response to the data timing control signal DDC supplied from the timing controller 120, convert the digital data signal into an analog data voltage based on a gamma reference voltage, and output the analog data voltage. The data driver 140 can supply a data voltage to the sub-pixels included in the display panel 150 through data lines DL1 to DLn. Here, n can be a positive number such as an integer greater than 1. The data driver 140 can take form of an IC and be mounted on the display panel 150 or mounted on a printed circuit board, but is not limited thereto.

The power supply 180 can generate a first voltage at a high level and a second voltage at a low level based on external input voltage supplied from the outside, and output the same through a first power line EVDD and a second power line EVSS, respectively. The power supply 180 can generate and output voltages for driving the scan driver 130 (e.g., gate voltages including a gate high voltage and a gate low voltage), and voltages for driving the data driver 140 (e.g., drain voltages including a drain voltage and a half drain voltage) as well as the first voltage and the second voltage.

The display panel 150 can display an image in response to driving signals including a scan signal and a data voltage, the first voltage, and the second voltage. The sub-pixels of the display panel 150 directly emit light, e.g., via organic light emitting diodes (OLEDs). The display panel 150 can be manufactured based on a substrate having rigidity or flexibility, such as glass, silicon, polyimide, or the like. In addition, the sub-pixels that emit light can include red, green, and blue sub-pixels (e.g., RGB) or include red, green, blue, and white sub-pixels (e.g., RGBW).

For example, one sub-pixel SP can be connected to the first data line DL1, the first gate line GL1, the first power line EVDD, and the second power line EVSS and can include a pixel circuit including a switching transistor, a driving transistor, a capacitor, an organic light emitting diode, and the like. Since the sub-pixel SP used in the light emitting display device directly emits light, the circuit configuration is complicated. In addition, there are various compensation circuits for compensating for deterioration of a driving transistor for supplying a driving current necessary to drive organic light emitting diodes emitting light as well as for deterioration of the organic light emitting diodes. Accordingly, it is noted that the sub-pixel SP is simply illustrated in the form of a block.

Meanwhile, in the above description, the timing controller 120, the scan driver 130, the data driver 140, and the like are described as individual components. However, depending on the implementation method of the light emitting display device, one or more of the timing controller 120, the scan driver 130, and the data driver 140 can be integrated into one IC.

Figure 3:
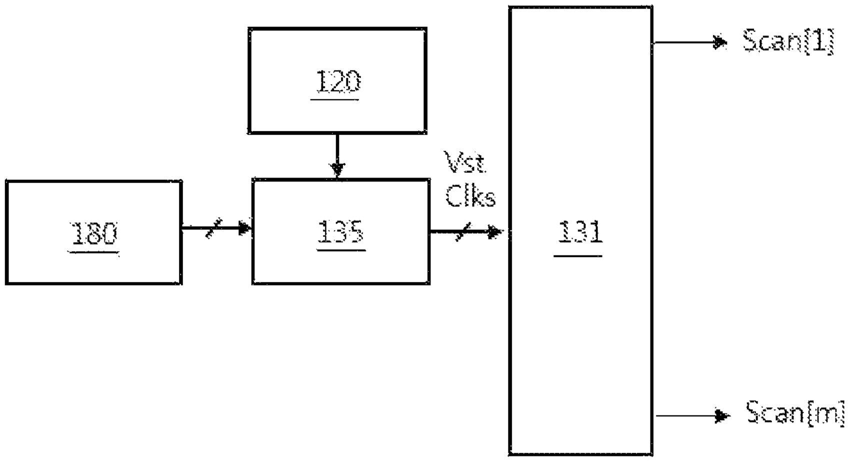
FIGS. 3 and 4 are diagrams for describing a configuration of a gate-in-panel type scan driver according to embodiments of the present invention.
Figure 4:
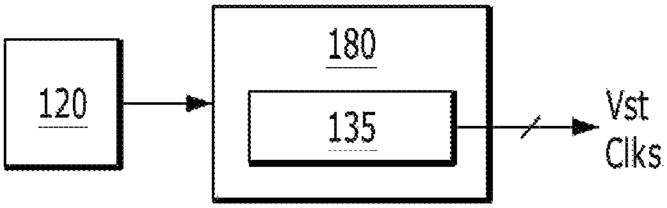
Figure 5A:
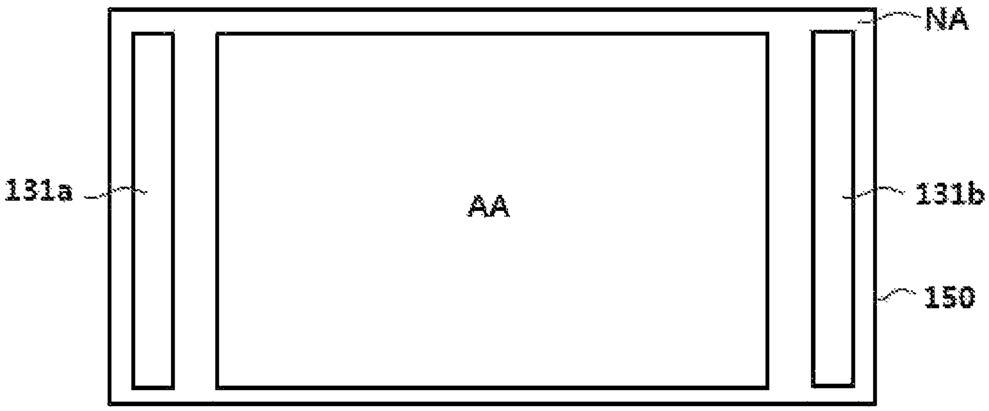
FIGS. 5A and 5B are diagrams illustrating an arrangement example of the gate-in-panel type scan driver according to embodiments of the present invention.
Figure 5B:
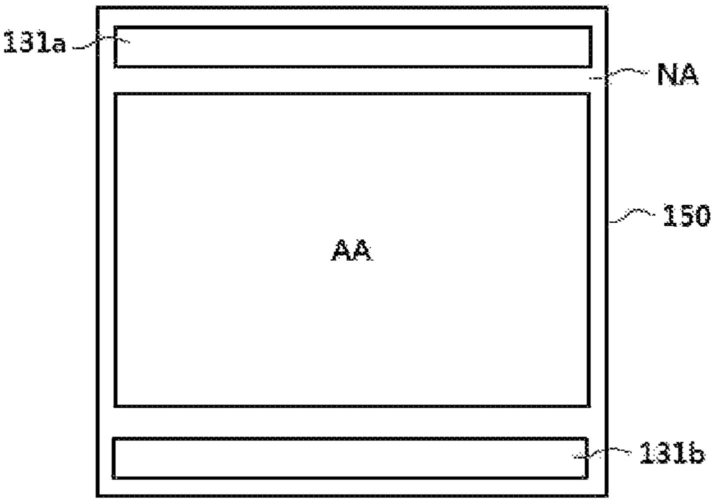

FIGS. 3 and 4 are diagrams for describing a configuration of a gate-in-panel type scan driver, and FIGS. 5A and 5B are diagrams illustrating arrangement examples of the gate-in-panel type scan driver.

As shown in FIG. 3, the gate-in-panel type scan driver 130 can include a shift register 131 and a level shifter 135. The level shifter 135 can generate driving clock signals Clks and a start signal Vst based on signals and voltages output from the timing controller 120 and the power supply 180. The driving clock signals Clks can be generated in the form of J different phases (J being an integer equal to or greater than 2), such as 2 phases, 4 phases, or 8 phases, and the like.

The shift register 131 operates based on the signals Clks and Vst output from the level shifter 135 and can output scan signals Scan[1] to Scan[m] for turning on or off transistors formed in the display panel (m being a positive integer greater than one). The shift register 131 can be formed as a thin film on the display panel in a gate-in-panel structure.

As shown in FIGS. 3 and 4, unlike the shift register 131, the level shifter 135 can be independently configured as an IC (e.g., see FIG. 3) or the level shifter 135 can be included in the power supply 180 (e.g., FIG. 4). However, these are merely examples and the present invention is not limited thereto.

As shown in FIG. 5A and FIG. 5B, shift registers 131*a* and 131*b* outputting scan signals in the gate-in-panel type scan driver can be disposed in a non-display area NA of the display panel 150. The shift registers 131*a* and 131*b* can be disposed in the left and right non-display areas NA, as shown in FIG. 5A, or disposed in the upper and lower non-display areas NA, as shown in FIG. 5B. Although FIG. 5A and FIG. 5B illustrate that the shift registers 131*a* and 131*b* are disposed in the non-display area NA, the present invention is not limited thereto.

Figure 6:
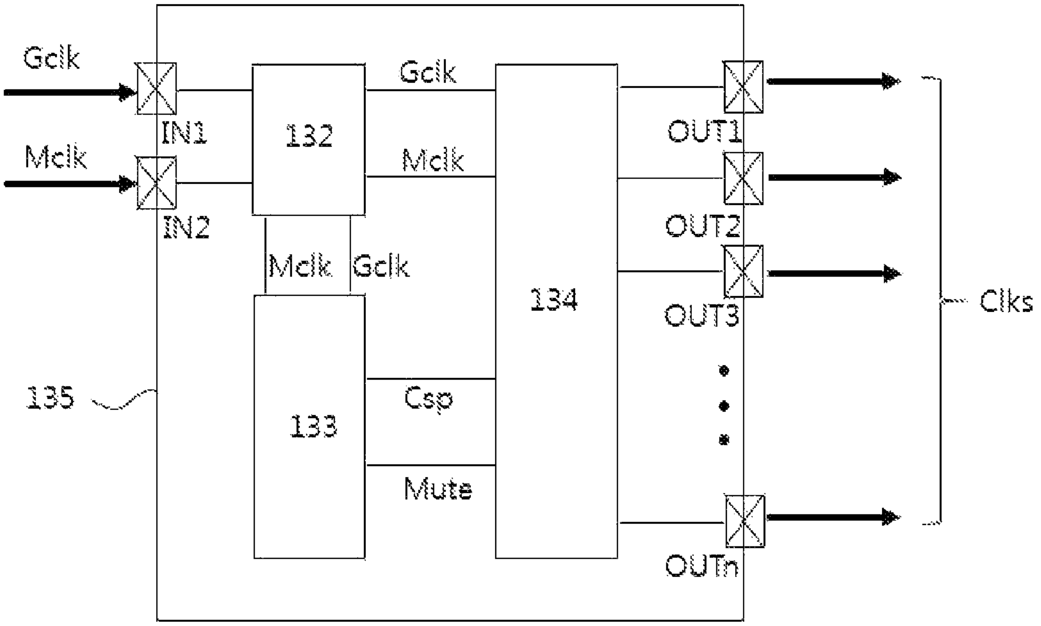
FIG. 6 is a circuit configuration diagram of a level shifter according to an embodiment of the present invention.
Figure 7:
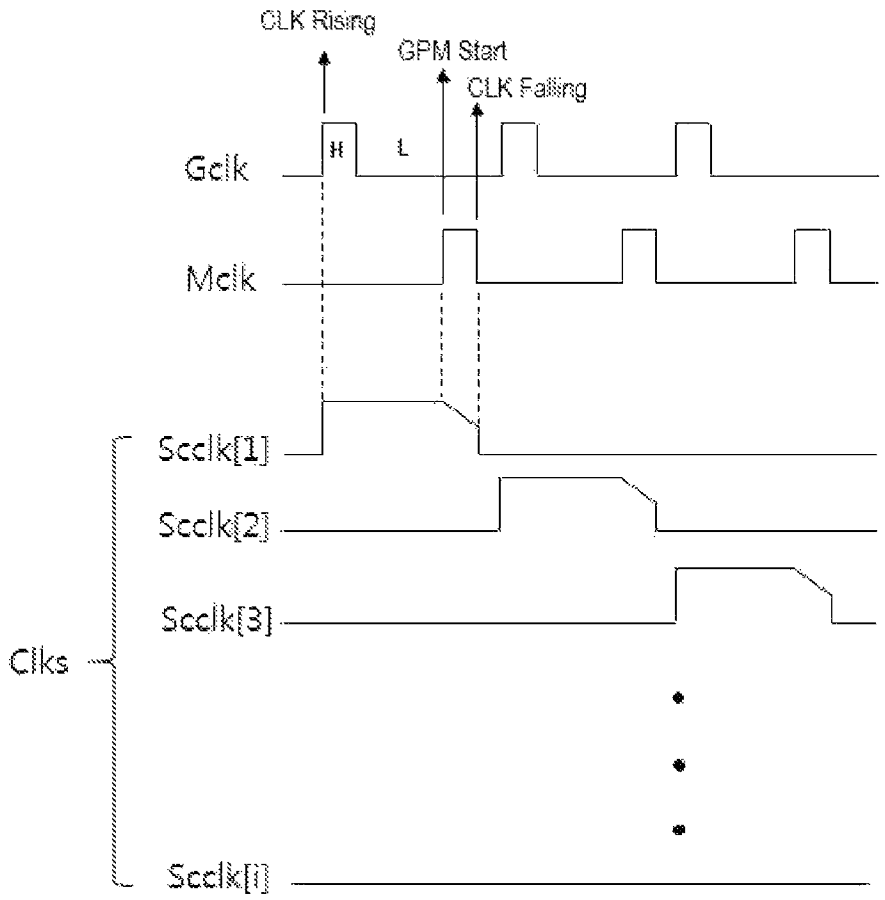
FIG. 7 is a waveform diagram for describing input/output of the level shifter according to an embodiment of the present invention.

FIG. 6 is a circuit configuration diagram of the level shifter according to a first embodiment of the present invention, and FIG. 7 is a waveform diagram for describing input/output of the level shifter according to the first embodiment of the present invention.

As shown in FIG. 6, the level shifter 135 according to the first embodiment of the present invention can include a signal input unit (circuit) 132, a driving mode conversion unit (circuit) 133, a signal output unit (circuit) 134, and the like.

The signal input unit 132 can serve to receive first and second clock signals Gclk and Mclk from the outside (e.g., the timing controller) through first and second input terminals IN1 and IN2 and to transmit the received signals to an internal device (e.g., internal circuit) of the level shifter 135.

The driving mode conversion unit 133 can serve to generate and output first and second mode signals Csp and Mute for converting a driving mode of the level shifter 135 based on the first and second clock signals Gclk and Mclk output from the signal input unit 132.

The signal output unit 134 can generate driving clock signal Clks such as a scan clock signal based on the first and second clock signals Gclk and Mclk output from the signal input unit 132 and the first and second mode signals Csp and Mute output from the driving mode conversion unit 133 and output the driving clock signals Clks through first to N-th output terminals OUT1 to OUTn. Here, n is an integer equal to or greater than 3.

As shown in FIGS. 6 and 7, the level shifter 135 according to the first embodiment of the present invention can generate and output the driving clock signals Clks including first to i-th scan clock signals Scclk[1] to Scclk[i] based on first and second clock signals Gclk and Mclk. Here, i is an integer equal to or greater than 3.

The first clock signal Gclk can serve to control a rising edge of a high period in the first to i-th scan clock signals Scclk[1] to Scclk[i], and the second clock signal Mclk can serve to control a falling edge of the high period in the first to i-th scan clock signals Scclk[1] to Scclk[i].

The first to i-th scan clock signals Scclk[1] to Scclk[i] can be sequentially generated so that their corresponding high periods do not overlap with each other. The first to i-th scan clock signals Scclk[1] to Scclk[i] can include a gate pulse modulation (GPM) period for modulating a signal waveform after the high period.

Each pulse in the first to i-th scan clock signals Scclk[1] to Scclk[i] can include a rising edge, a gate pulse modulation period, and a falling edge. A generation process of the rising edge, the gate pulse modulation period, and the falling edge will be described below based on the first scan clock signal Scclk[1].

A rising edge of a high period in the first scan clock signal Scclk[1] can occur in response to a rising edge CLK Rising of a high period H in the first clock signal Gclk (e.g., a rising edge of the first scan clock signal Scclk[1] can be synchronized with a rising edge of the first clock signal Gclk, see FIG. 7). A gate pulse modulation period in the first scan clock signal Scclk[1] can start in response to a rising edge GPM Start of a high period H in the second clock signal Mclk (e.g., the start of a falling edge of the first scan clock signal Scclk[1] can be synchronized with a rising edge of the second clock signal Mclk). In the first scan clock signal Scclk[1], a falling edge of the high period and the end point of the gate pulse modulation period can occur in response to a falling edge CLK Falling of the high period in the second clock signal Mclk.

As mentioned above, the level shifter 135 according to the first embodiment of the present invention can change driving modes so that the first to i-th scan clock signals Scclk[1] to Scclk[i] can be generated in a variable manner, which will be discussed in more detail below.

Figure 8:
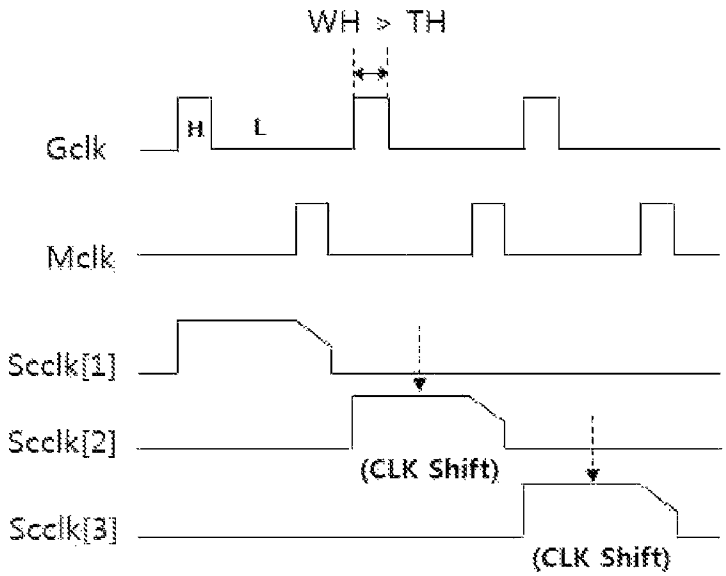
FIGS. 8 and 9 are waveform diagrams for describing a first driving mode of the level shifter according to an embodiment of the present invention.
Figure 9:
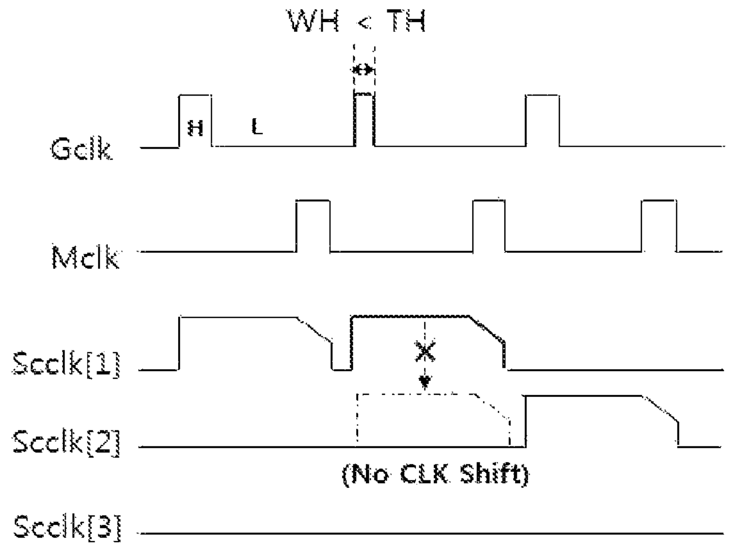
Figure 10:
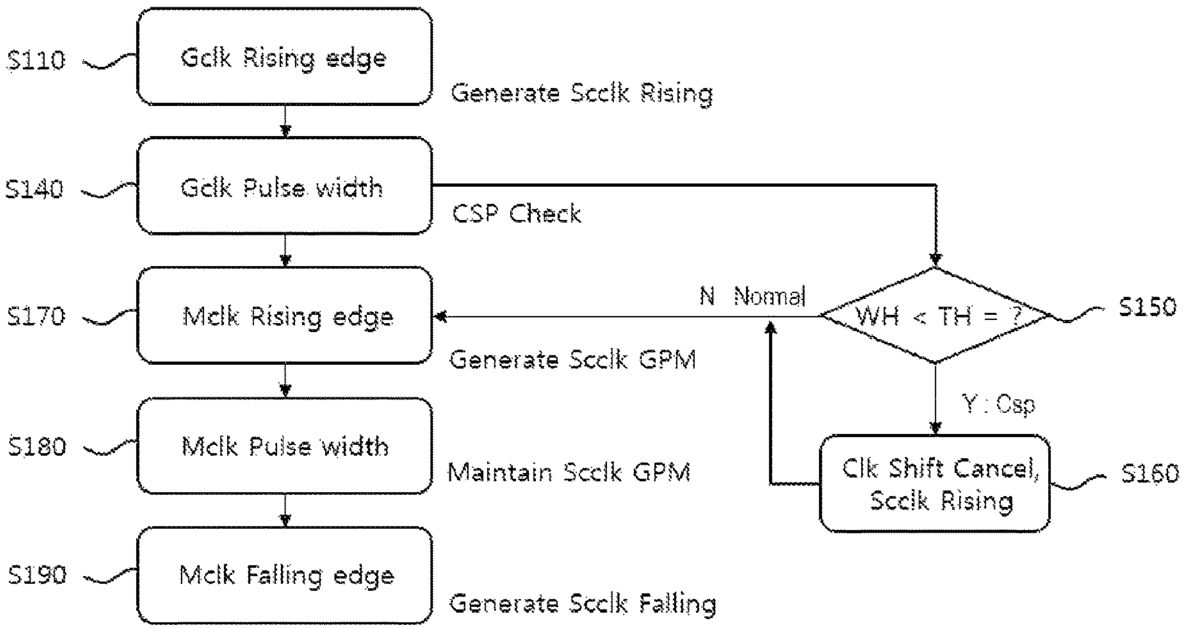
FIG. 10 is a flowchart for describing the first driving mode of the level shifter according to an embodiment of the present invention.

FIGS. 8 and 9 are waveform diagrams for describing a first driving mode of the level shifter according to the first embodiment of the present invention, and FIG. 10 is a flowchart for describing the first driving mode of the level shifter according to the first embodiment of the present invention. For example, in the first driving mode, the level shifter 135 can provide a normal driving operation in which clock shift is provided, and a clock shift prevention operation in which clock shift is prevented, based on whether or not the first mode signal Csp is generated. Also, the first mode signal Csp can be generated by the driving mode conversion unit 133 and output to the signal output unit 134 when a pulse width WH of the high period of the first clock signal Gclk is less than a threshold value TH (WH<TH).

As shown in FIG. 8, the level shifter according to the first embodiment of the present invention can generate a high period of the first scan clock signal Scclk[1] and then generate a high period of the second scan clock signal Scclk[2]. Then, the level shifter can generate a high period of the second scan clock signal Scclk[2] and then generate a high period of the third scan clock signal Scclk[3]. For example, level shifter can generate a pulse for the first scan clock signal Scclk[1], then generate a pulse for the second scan clock signal Scclk[2] that is shifted in time relative to the pulse of scan clock signal Scclk[1], and then generate a pulse for the third scan clock signal Scclk[3] that is shifted in time relative to the pulse of scan clock signal Scclk[2]. As shown in FIG. 8, the pulses of the first scan clock signal Scclk[1], the second scan clock signal Scclk[2] and the third scan clock signal Scclk[3] can be shifted in time so that they do not overlap with each other.

In addition, as shown in FIG. 9, the level shifter according to the first embodiment of the present invention can generate a high period of the first scan clock signal Scclk[1] and then generate another high period of the first scan clock signal Scclk[1] (e.g., two pulses for the first scan clock signal Scclk[1] can be generated in quick succession before a pulse of the second scan clock signal Scclk[2] is generated). And then, the level shifter can generate a high period of the second scan clock signal Scclk[2].

As can be ascertained with reference to FIGS. 8 and 9, the level shifter according to the first embodiment of the present invention can output the first to i-th scan clock signals Scclk[1] to Scclk[i] including one or two high periods. For example, based on a width of a pulse of the first clock signal Gclk, the level shifter can sequentially generate a pulse for each of the first to i-th scan clock signals Scclk[1] to Scclk[i] one at a time (e.g., FIG. 8), or the level shifter can generate two pulses in close succession for one of the first to i-th scan clock signals Scclk[1] to Scclk[i] before generating a pulse for another one of the i-th scan clock signals Scclk[1] to Scclk[i] (e.g., FIG. 9).

The level shifter according to the first embodiment of the present invention may or may not execute clock shift on the first to i-th scan clock signals Scclk[1] to Scclk[i] based on a pulse width WH of a high period of the first clock signal Gclk and a threshold value TH set therein.

When clock shift is executed, a high period pulse is generated for the next scan clock signal following an earlier high period pulse of another scan clock signal (e.g., see FIG. 8, in which the first scan clock signal Scclk[1] has a high period pulse, and then the second scan clock signal Scclk[2] has a high period pulse). On the other hand, if clock shift is not executed, the first scan clock signal can include at least two high periods generated in close succession because a high period does not pass to the next generated scan clock signal.

To this end, the level shifter can detect the pulse width WH of the high period of the first clock signal Gclk by counting or measuring a time period during which the high period H is maintained in the first clock signal Gclk. In addition, the level shifter can compare the detected pulse width WH of the high period of the first clock signal Gclk with the threshold value TH. If the detected pulse width WH of the high period of the first clock signal Gclk is greater than the threshold value TH (e.g., WH>TH), then clock shift can be performed so that one high period is included in the next scan clock signal, as shown in FIG. 8. However, if the detected pulse width WH of the high period of the first clock signal Gclk is less than the threshold value TH (e.g., WH<TH), then clock shift may not be executed so that at least two high periods are included in the current scan clock signal in close succession (e.g., see Scclk[1] in FIG. 9).

As shown in FIG. 10, the level shifter according to the first embodiment of the present invention can generate and output a plurality of scan clock signals through a rising edge generation step (S110) to a falling edge generation step (S190). This will be described as follows.

The level shifter can generate a rising edge (Scclk Rising edge) of a high period of a scan clock signal in response to a rising edge (Gclk Rising edge) of the first clock signal Gclk (S110). The level shifter can detect a pulse width (Gclk pulse width) of a high period of the first clock signal Gclk to determine whether to execute clock shift for the first to i-th scan clock signals Scclk[1] to Scclk[i] (S140). The step of detecting the pulse width (Gclk pulse width) of the high period of the first clock signal Gclk can be defined as a step of checking (CSP Check) whether to operate the level shifter in the first driving mode.

The level shifter can compare the pulse width WH of the high period of the first clock signal Gclk with a threshold value TH (S150). When the pulse width WH of the high period of the first clock signal Gclk is greater than the threshold value TH (WH<TH=N), the level shifter can be normally driven and provide clock shift for the first to i-th scan clock signals Scclk[1] to Scclk[i]. In this situation, the level shifter can perform clock shift (CLK shift) so that one high period is included in the scan clock signal and then sequentially generated in the next scan clock signal, as shown in FIG. 8.

On the other hand, if the pulse width WH of the high period of the first clock signal Gclk is less than the threshold value TH (WH<TH=Y), then the level shifter can generate the first mode signal Csp in order to operate in the first driving mode. In this situation, the level shifter may not execute clock shift (No CLK Shift) so that two high periods are included in the scan clock signal in close succession, as shown in FIG. 9. Accordingly, the level shifter can cancel or prevent clock shift for the next clock signal and generate two successive pulses in the same clock signal (Clk Shift Cancel, Sclk Rising) (S160).

The level shifter can start gate pulse modulation period for the high period of the scan clock signal in response to a rising edge of the second clock signal Mclk (Mclk Rising edge) (Scclk GPM generation) (S170). The level shifter can maintain a gate pulse modulation period of the scan clock signal (Scclk GPM) in response to the pulse width (Mclk pulse width) of the high period of the second clock signal (S180). For example, a period for the start gate pulse modulation for the high period the scan clock signal can be set equal to or approximately equal to a width of a pulse of the second clock signal Mclk (e.g., the gate pulse modulation period can be synchronized with a rising edge and a falling edge of the second clock signal Mclk).

The level shifter can end the high period and the gate pulse modulation period of the scan clock signal in response to a falling edge of the second clock signal (Mclk Falling edge) and generate a low period of the scan clock signal (Scclk Falling generation) (S190).

Figure 11:
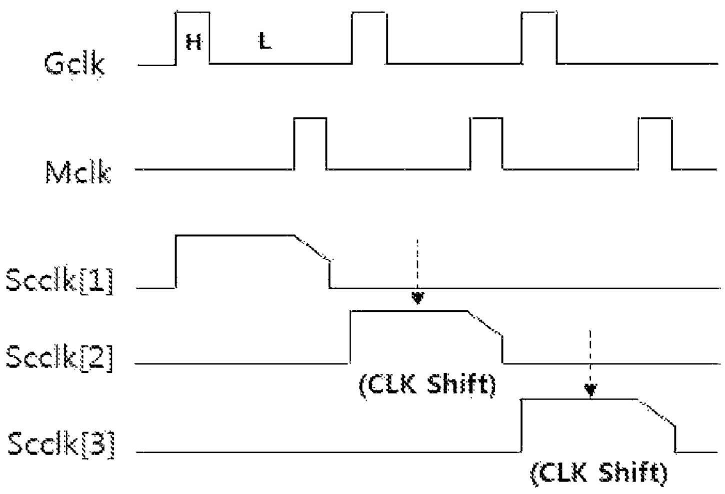
FIGS. 11 and 12 are waveform diagrams for describing a second driving mode of the level shifter according to an embodiment of the present invention.
Figure 12:
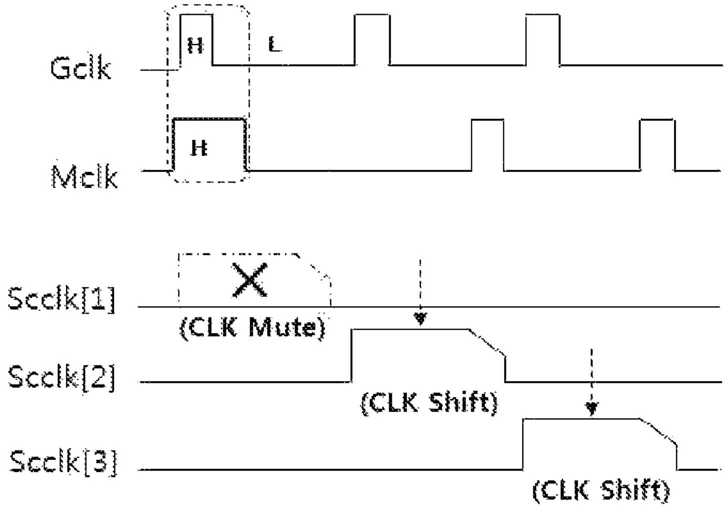
Figure 13:
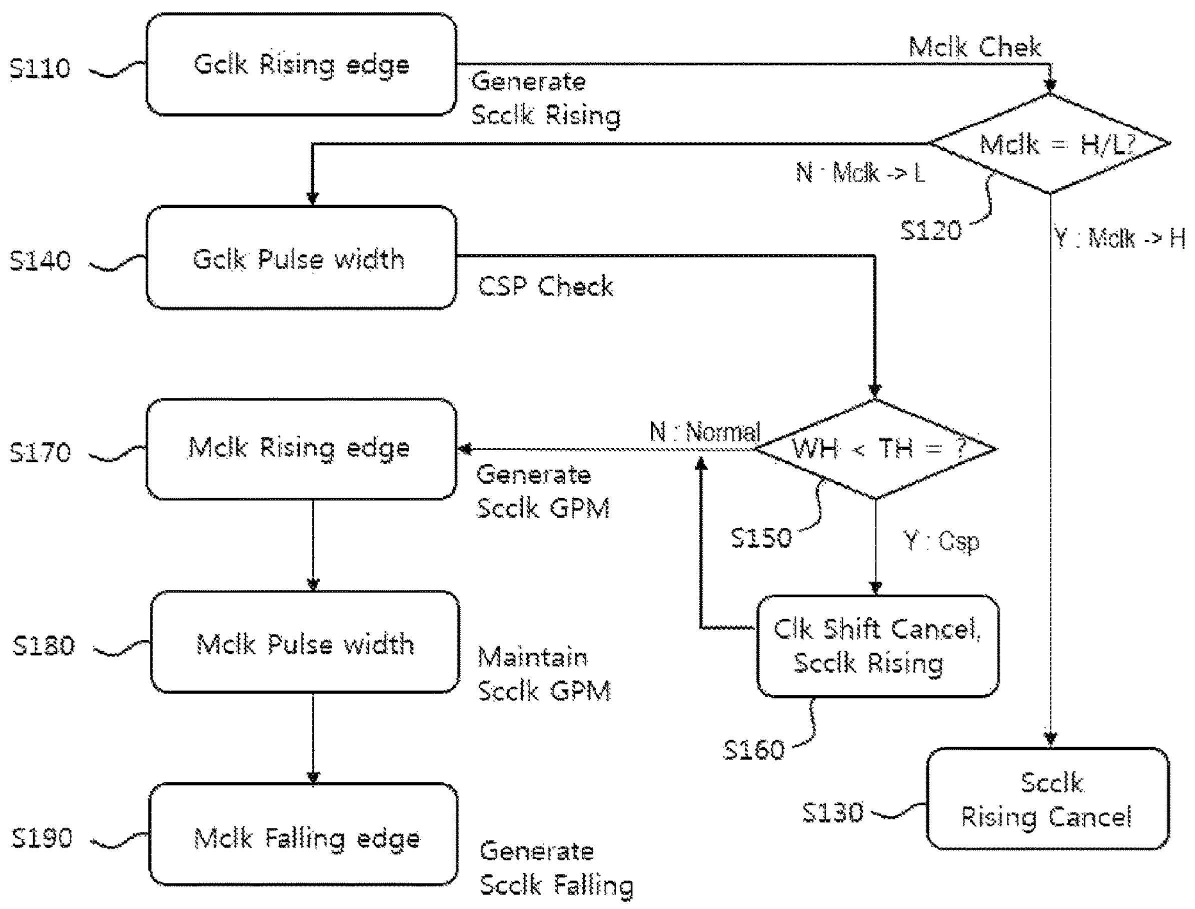
FIG. 13 is a flowchart for describing the second driving mode of the level shifter according to an embodiment of the present invention.

FIGS. 11 and 12 are waveform diagrams for describing a second driving mode of the level shifter according to the first embodiment of the present invention, and FIG. 13 is a flowchart for describing the second driving mode of the level shifter according to the first embodiment of the present invention. The second driving mode can provide a Mute off operation in which a normal pulse is generated for a clock signal, and a Mute on operation in which a pulse is not generated for a clock signal and the clock signal is "muted."

As shown in FIG. 11, the level shifter according to the first embodiment of the present invention can generate a high period of the first scan clock signal Scclk[1], then generate a high period of the second scan clock signal Scclk[2], and then generate a high period of the third scan clock signal Scclk[3].

In addition, the level shifter according to the first embodiment of the present invention can omit a high period so that the high period is not included in the first scan clock signal Scclk[1] and then generate a high period of the second scan clock signal Scclk[2], as shown in FIG. 12 (e.g., one of the scan clock signals can be selectively "muted" or "silenced"

and maintained at a low state). Then, the level shifter can generate a high period of the third scan clock signal Scclk [3].

As can be ascertained with reference to FIGS. 11 and 12, the level shifter according to the first embodiment of the present invention can output the first to i-th scan clock signals Scclk[1] to Scclk[i], but omit generation of a high period in at least one of the first to i-th scan clock signals (e.g., “mute” one of the scan clock signals).

The level shifter according to the first embodiment of the present invention can execute clock mute for omitting high periods included in the first to i-th scan clock signals Scclk [1] to Scclk[i] based on high periods H of the first clock signal Gclk and high periods of the second clock signal Mclk. In other words, when the first clock signal Gclk and the second clock signal Mclk are both in a high state, a function in which a rising edge of the first clock signal Gclk occurs is masked, and a pulse of one of the clock signals can be muted or prevented from being generated To this end, the level shifter can detect the first clock signal Gclk and the second clock signal Mclk. In addition, the level shifter can determine whether a high period of the second clock signal Mclk overlaps with a high period of the first clock signal Gclk. If the high period H of the first clock signal Gclk and the high period of the second clock signal Mclk do not overlap, clock shift can be executed normally so that one high period is included in the current scan clock signal, as shown in FIG. 11. However, if the high period H of the first clock signal Gclk and the high period of the second clock signal Mclk overlap (e.g., the first clock signal Gclk and the second clock signal Mclk are both high at the same time), clock mute can be executed so that a high period is not included in the current scan clock signal (e.g., see Scclk[1], as shown in FIG. 12).

As shown in FIG. 13, the level shifter according to the first embodiment of the present invention can generate and output a plurality of scan clock signals through a rising edge generation step S110 to a falling edge generation step S190. This will be described below.

The level shifter can generate a rising edge (Scclk Rising edge) of a high period of a scan clock signal in response to a rising edge (Gclk Rising edge) of the first clock signal Gclk (S110). The level shifter can determine whether a high period of the second clock signal Mclk that occurs is overlapping with a high period of the first clock signal Gclk to determine whether to execute clock mute (S120). The step of detecting whether a high period of the second clock signal Mclk occurs while the first clock signal Gclk has a high period can be defined as a step of checking whether the level shifter is operated in the second driving mode (Mclk Check).

If the high period of the first clock signal Gclk and the high period of the second clock signal Mclk do not overlap with each (N: Mclk—>L), then the level shifter determines whether to execute clock shift (S140). If the high period of the first clock signal Gclk and the high period of the second clock signal Mclk overlap (Y: Mclk—>H), the level shifter can execute clock mute to cancel scan clock signal rising so that a high period is not included in the current scan clock signal (e.g., Scclk[1]) (S130), as shown in FIG. 12. For example, the level shifter can first determine whether the clock mute operation should be performed, then the level shifter can determine whether or not the normal clock shift operation is to be performed, alternatively these operations can be performed in parallel or in a different order. For example, the flow chart in FIG. 13 is similar to the flow chart in FIG. 10, but includes the additional steps of S120 and S130 regarding whether to execute the clock mute operation, which can be initiated between steps S110 and S140.

The level shifter can detect a pulse width (Gclk pulse width) of the high period of the first clock signal Gclk to determine whether to execute clock shift (S140). The step of detecting the pulse width (Gclk pulse width) of the high period of the first clock signal Gclk can be defined as a step of checking whether to operate the level shifter in the first driving mode (CSP Check).

The level shifter can compare the pulse width WH of the high period of the first clock signal Gclk with a threshold value TH (S150). When the pulse width WH of the high period of the first clock signal Gclk is greater than the threshold value TH (WH<TH=N), the level shifter can be normally driven. In this situation, the level shifter can execute clock shift so that one high period is included in the scan clock signal, as shown in FIG. 8.

On the other hand, if the pulse width WH of the high period of the first clock signal Gclk is less than the threshold value TH (WH<TH=Y), the level shifter can generate the first mode signal Csp in order to operate a no clock shift function in the first driving mode. In this situation, the level shifter may not execute clock shift (No CLK Shift) so that two high periods are included in the scan clock signal, as shown in FIG. 9. Accordingly, the level shifter can cancel clock shift and generate a rising edge of the scan clock signal (S160). For example, in the first driving mode, the level shifter 135 can provide a normal driving operation in which clock shift is provided, and a clock shift prevention operation in which clock shift is prevented, based on whether or not the first mode signal Csp is generated. Also, the first mode signal Csp is generated by the driving mode conversion unit 133 and output to the signal output unit 134 when the pulse width WH of the high period of the first clock signal Gclk is less than the threshold value TH (WH<TH).

The level shifter can start gate pulse modulation for the high period of the scan clock signal in response to a rising edge (Mclk Rising edge) of the second clock signal (Scclk GPM generation) (S170). The level shifter can maintain a gate pulse modulation period of the scan clock signal in response to the pulse width (Mclk pulse width) of the high period of the second clock signal (S180).

The level shifter can end the high period and the gate pulse modulation period of the scan clock signal in response to a falling edge of the second clock signal (Mclk Falling edge) and generate a low period of the scan clock signal (S190).

Figure 14:
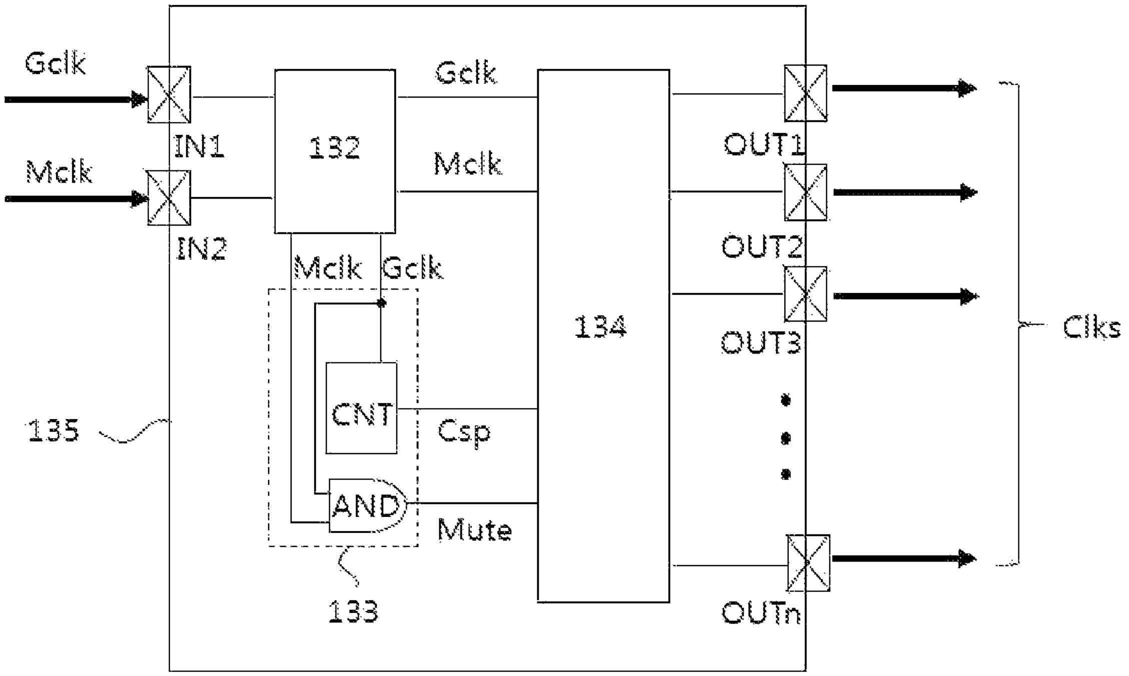
FIG. 14 is a circuit configuration diagram of a level shifter according to another embodiment of the present invention.
Figure 15:
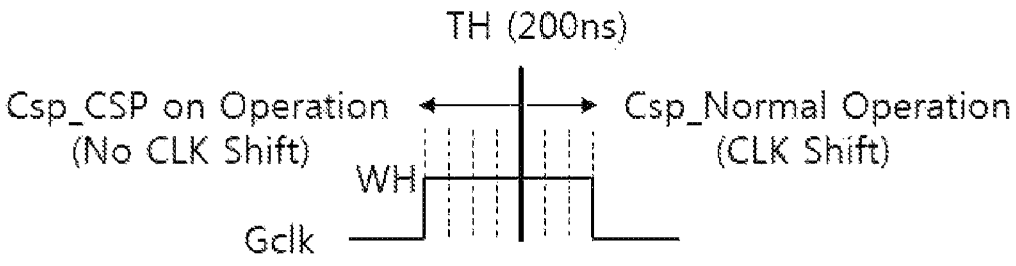
FIGS. 15 and 16 are diagrams for describing an operation of a driving mode conversion unit shown in FIG. 14.
Figure 16:
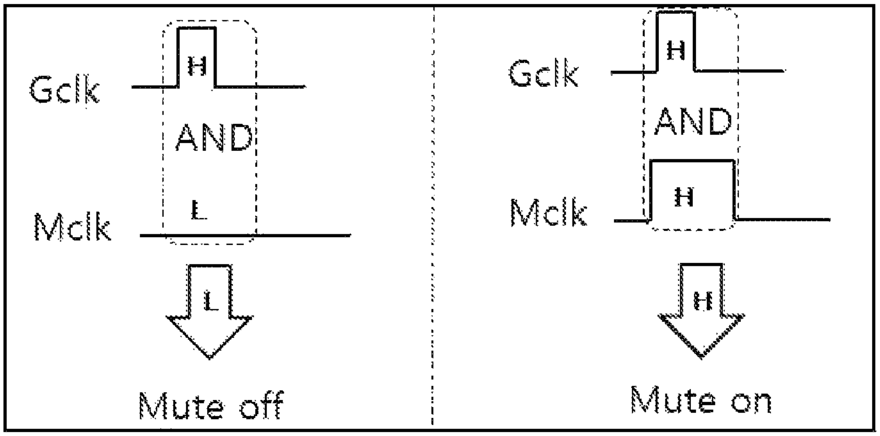

FIG. 14 is a circuit configuration diagram of a level shifter according to a second embodiment of the present invention, and FIGS. 15 and 16 are diagrams for describing the operation of a driving mode conversion unit shown in FIG. 14.

As shown in FIG. 14, the level shifter 135 according to the second embodiment of the present invention can include a signal input unit 132, a driving mode conversion unit 133, a signal output unit 134, and the like. The level shifter 135 according to the second embodiment differs from that of the first embodiment with respect to the configuration and operation of the driving mode conversion unit 133, and thus differences will be mainly described.

The driving mode conversion unit 133 can include a counter CNT and an AND gate AND in order to output mode signals for converting or adjusting the driving mode of the level shifter. The counter CNT can serve to output the first mode signal Csp related to the first driving mode of the level shifter 135. The AND gate AND can serve to output the second mode signal Mute related to the second driving mode of the level shifter 135.

As shown in FIGS. 14 and 15, the counter CNT can count a time period during which a high period H is maintained in the first clock signal Gclk to detect a pulse width WH of the first clock signal Gclk. The counter CNT can compare the detected pulse width WH of the first clock signal Gclk with a threshold value TH determined therein.

If the pulse width WH of the first clock signal Gclk is greater than the internally determined threshold TH (e.g., 200 ns), then the counter CNT can output a first mode off signal Csp_off Operation for executing clock shift so that one high period is included in the next scan clock signal (e.g., see FIG. 8).

If the pulse width WH of the first clock signal Gclk is less than the internally determined threshold TH (e.g., 200 ns), then the counter CNT can output a first mode on signal Csp_on Operation for not executing clock shift so that at least two high periods are included in the current scan clock signal (e.g., FIG. 9).

As shown in FIGS. 14 and 16, the AND gate AND can perform a logical AND operation on the first clock signal Gclk and the second clock signal Mclk to output a logic low signal L or a logic high signal H.

The AND gate AND can output a logic low signal L that is a second mode off signal CLK Mute Off for not executing clock mute when a high period H of the first clock signal Gclk and a high period of the second clock signal Mclk do not overlap (e.g., one of the first clock signal Gclk and the second clock signal Mclk is high, while the other is low).

However, when the high period H of the first clock signal Gclk and the high period of the second clock signal Mclk do overlap with each other, the AND gate AND can output a logic high signal H that is a second mode on signal CLK Mute on for executing clock mute (e.g., both of the first clock signal Gclk and the second clock signal Mclk are high at the same time).

Figure 17:
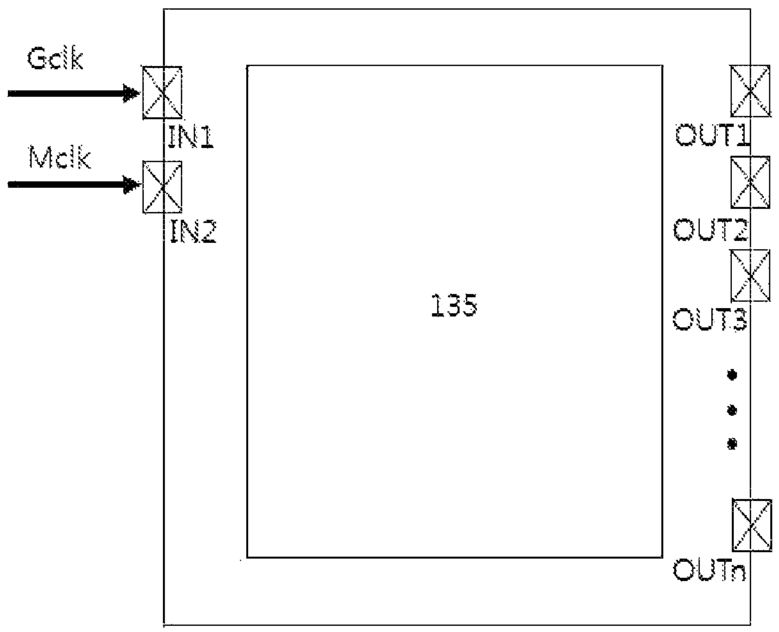
FIGS. 17 and 18 are diagrams for describing the advantages of a level shifter according to an embodiment of the present invention.
Figure 18:
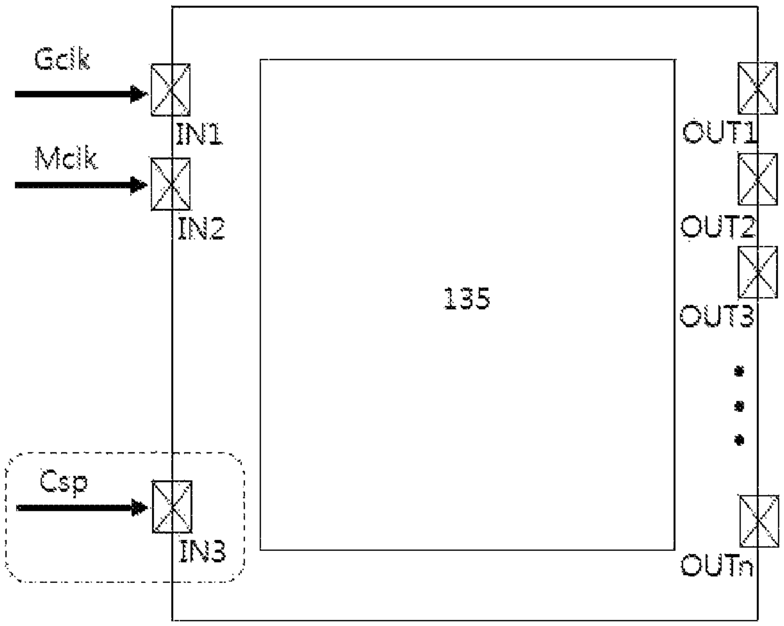

FIGS. 17 and 18 are diagrams for describing the advantages of the level shifter according to the embodiment of the present invention.

The level shifter 135 according to the embodiment of the present invention shown in FIG. 17 can selectively execute at least one of clock shift operation and a clock mute operation based on just the first clock signal Gclk and the second clock signal Mclk as in the first and second embodiments described above.

On the other hand, a level shifter 135 according to a comparative example shown in FIG. 18 can selectively execute at least one of clock shift and clock mute only upon reception of an additional signal Csp through a third input terminal IN3.

Accordingly, since the level shifter 135 according to the embodiment of the present invention can generate mode signals capable of converting a driving mode by itself (e.g., the mode signals can be self-generated internally, inside the level shifter without required an additional external input), the number of input terminals and signal lines for receiving an additional signal from the timing controller can be reduced.

As described above, the present invention has an effect of reducing the number of input terminals and signal lines required for a circuit configuration based on the level shifter capable of self-generating mode signals for converting driving modes by itself. In addition, the present invention can reduce the number of input terminals and signal lines of the level shifter, thereby increasing a degree of freedom in design (increasing PCB layout efficiency or IC packaging efficiency) at the time of manufacturing a display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display device comprising:

a timing controller configured to output a first clock signal and a second clock signal;

a level shifter including:

a signal input circuit configured to receive the first clock signal and the second clock signal from the timing controller, a driving mode conversion circuit configured to self-generate one or more mode signals based on the first clock signal and the second clock signal for adjusting a driving mode of the level shifter, and a signal output circuit configured to generate a plurality of scan clock signals based on the one or more mode signals, the first clock signal and the second clock signal;

a shift register configured to generate a scan signal based on the plurality of scan clock signals output from the level shifter; and a display panel configured to display an image based on the scan signal output from the shift register, wherein the level shifter is configured to:

in response to a width of a pulse of the first clock signal being greater than a threshold value, sequentially output a pulse for each of the plurality of scan clock signals, and in response to a width of a pulse of the first clock signal being less than a threshold value, output two successive pulses for one of the plurality of scan clock signals.

2. The display device of claim 1, wherein the one or more mode signals are not generated based on any other signal externally input to the level shifter other than the first clock signal and the second clock signal.

3. The display device of claim 1, wherein the plurality of scan clock signals are shifted and do not overlap with each other.

4. The display device of claim 1, wherein other scan clock signals among the plurality of scan clock signals, which are different than the one of the plurality of scan clock signals, do not include any pulse generated between the two successive pulses.

5. The display device of claim 1, wherein the level shifter is configured to:

output a pulse for one of the plurality of scan clock signals, wherein a rising edge of the pulse for the one of the plurality of scan clock signals is based on a rising edge of the first clock signal, and wherein a falling edge of the pulse for the one of the plurality of scan clock signals is based on a rising edge of the second clock signal.

6. The display device of claim 1, wherein pulses of the plurality of scan clock signals do not overlap with each other.

7. The display device of claim 1, wherein the driving mode conversion circuit includes a counter configured to:

measure a time period of a pulse of the first clock signal, and in response to the time period being less than a threshold value, output a first mode signal to the signal output circuit, and wherein the signal output circuit is configured to:

in response to receiving the first mode signal from the driving mode conversion circuit, output two successive pulses for one of the plurality of scan clock signals based on the first clock signal and the second clock signal.

8. The display device of claim 1, wherein the driving mode conversion circuit includes a logical AND gate configured to:

receive the first clock signal and the second clock signal, and in response to receiving a pulse of the first clock signal and a pulse of the second clock signal at a same time, output a second mode signal to the signal output circuit, and wherein the signal output circuit is configured to:

in response to receiving the second mode signal from the driving mode conversion circuit, perform a mute operation for one of the plurality of scan clock signals so that no pulse is output for the one of the plurality of scan clock signals when the pulse of the first clock signal and the pulse of the second clock signal are received by the logical AND gate at the same time.

9. The display device of claim 1, wherein a pulse of each of the plurality of scan clock signals has a gate pulse modulation period at a falling edge of the pulse and including a decreasing slope, wherein a start of the gate pulse modulation period is based on a rising edge of the second clock signal, and wherein an end of the gate pulse modulation period is based on a falling edge of the second clock signal.

10. The display device of claim 1, wherein a pulse of each of the plurality of scan clock signals is synchronized with a rising edge of the first clock signal and a falling edge of the second clock signal.

11. A display device comprising:

a timing controller configured to output a first clock signal and a second clock signal;

a level shifter including:

a signal input circuit configured to receive the first clock signal and the second clock signal from the timing controller, a driving mode conversion circuit configured to self-generate one or more mode signals based on the first clock signal and the second clock signal for adjusting a driving mode of the level shifter, and a signal output circuit configured to generate a plurality of scan clock signals based on the one or more mode signals, the first clock signal and the second clock signal;

a shift register configured to generate a scan signal based on the plurality of scan clock signals output from the level shifter; and a display panel configured to display an image based on the scan signal output from the shift register, wherein the level shifter is configured to:

in response to a width of a pulse of the first clock signal being greater than a threshold value, sequentially output a pulse for each of the plurality of scan clock signals, and in response to a pulse of the first clock signal overlapping with a pulse of the second clock signal, perform a mute operation for one of the plurality of scan clock signals so that no pulse is output for the one of the plurality of scan clock signals when the pulse of the first clock signal overlaps with the pulse of the second clock signal.

12. The display device of claim 11, wherein the level shifter is configured to:

in response to the pulse of the first clock signal not overlapping with the pulse of the second clock signal, omit the mute operation and output a pulse for one of the plurality of scan clock signals that overlaps with both of the pulse of the first clock signal and the pulse of the second clock signal.

13. A level shifter comprising:

an internal circuit configured to:

receive a first clock signal and a second clock signal;

in response to a width of a pulse of the first clock signal being greater than a threshold value, sequentially output a pulse for each of a plurality of scan clock signals;

in response to the width of the pulse of the first clock signal being less than the threshold value, output two successive pulses for one of the plurality of scan clock signals; and in response to the pulse of the first clock signal overlapping with the pulse of the second clock signal, perform a mute operation for the one of the plurality of scan clock signals so that no pulse is output for the one of the plurality of scan clock signals when the pulse of the first clock signal overlaps with the pulse of the second clock signal.

14. The level shifter of claim 13, wherein the plurality of scan clock signals are shifted and do not overlap with each other.

15. The level shifter of claim 13, wherein other scan clock signals among the plurality of scan clock signals, which are different than the one of the plurality of scan clock signals, do not include any pulse generated between the two successive pulses.

16. The level shifter of claim 13, wherein the level shifter is configured to:

in response to the pulse of the first clock signal not overlapping with the pulse of the second clock signal, omit the mute operation and output a pulse for one of the plurality of scan clock signals that overlaps with both of the pulse of the first clock signal and the pulse of the second clock signal.

17. The level shifter of claim 13, wherein the level shifter is configured to:

output a pulse for one of the plurality of scan clock signals, wherein a rising edge of the pulse for the one of the plurality of scan clock signals is based on a rising edge of the first clock signal, and wherein a falling edge of the pulse for the one of the plurality of scan clock signals is based on a rising edge of the second clock signal.

18. The level shifter of claim 13, wherein a pulse of each of the plurality of scan clock signals is synchronized with a rising edge of the first clock signal and a falling edge of the second clock signal.

19. The level shifter of claim 13, wherein pulses of the first clock signal do not overlap with pulses of the second clock signal.

* * * * *